(12) United States Patent
Clucas

(10) Patent No.: US 8,464,629 B2
(45) Date of Patent: Jun. 18, 2013

(54) MULTICYLINDER FREE PISTON MACHINE

(75) Inventor: Donald Murray Clucas, Christchurch (NZ)

(73) Assignee: Suma Algebraica, S.L., Aretxabaleta (ES)

( * ) Notice: Subject to any disclaimer, the term of this patent is extended or adjusted under 35 U.S.C. 154(b) by 745 days.

(21) Appl. No.: 12/670,754

(22) PCT Filed: Aug. 4, 2008

(86) PCT No.: PCT/NZ2008/000194
§ 371 (c)(1),
(2), (4) Date: Mar. 18, 2010

(87) PCT Pub. No.: WO2009/017429
PCT Pub. Date: Feb. 5, 2009

(65) Prior Publication Data
US 2010/0186584 A1     Jul. 29, 2010

(30) Foreign Application Priority Data
Aug. 2, 2007 (NZ) ........................ 560333

(51) Int. Cl.
*F01B 29/00* (2006.01)

(52) U.S. Cl.
USPC ............................................. 92/143

(58) Field of Classification Search
USPC ............................. 92/12.2, 71, 143
See application file for complete search history.

(56) References Cited

U.S. PATENT DOCUMENTS

| 4,819,439 | A | 4/1989 | Higham |
| 6,933,629 | B2 | 8/2005 | Qiu et al. |
| 7,134,279 | B2 | 11/2006 | White et al. |
| 7,171,811 | B1 | 2/2007 | Berchowitz et al. |
| 2010/0236400 | A1* | 9/2010 | Duke et al. ............ 92/12.2 |

FOREIGN PATENT DOCUMENTS

| GB | 470806 | 8/1937 |
| GB | 1037678 | 8/1966 |

* cited by examiner

*Primary Examiner* — Michael Leslie
(74) *Attorney, Agent, or Firm* — Frommer Lawrence & Haug LLP; Ronald R. Santucci

(57) ABSTRACT

A machine such as an external combustion engine in an electrical power and heat cogeneration unit comprises multiple cylinders, each driving an independent load or being independently driven, and a balance shaft comprising one or more off-center balancing mass(es) to counteract rocking motion created by the piston motion and thereby assist in dynamically balancing the machine.

17 Claims, 1 Drawing Sheet

MULTICYLINDER FREE PISTON MACHINE

This application is a 371 of PCT/NZ2008/000194 filed on Aug. 4, 2008, published on Feb. 5, 2009 under publication number WO 2009/017429 A and claims priority benefits of New Zealand Patent Application No. 560333 filed Aug. 2, 2007 the disclosure of which is hereby incorporated by reference.

FIELD OF INVENTION

The invention relates to a balanced multicylinder free piston machine which in one embodiment may be a balanced multicylinder free piston Stirling engine.

BACKGROUND

U.S. Pat. Nos. 7,134,279 and 7,171,811 disclose Multiple cylinder, free piston Stirling engines. By a free piston machine or engine is meant a machine or engine which does not use a kinematic mechanism to mechanically link the pistons together and to a rotating shaft. Instead, in the case of an engine power is absorbed using linear electric generators driven one by each piston. The electrical outputs of the generators may be combined. In the case of a machine in which the pistons are driven such as a pump or a compressor, each piston is driven independently, by a linear electric motor for example.

SUMMARY OF INVENTION

In broad terms the invention comprises a machine comprising multiple cylinders each housing a piston for reciprocating movement within the cylinder, the piston-cylinders being arranged for piston movement parallel to a common axis, each piston driving an independent load or being independently driven, wherein the machine comprises a balance shaft arranged to rotate Synchronously with the piston motion about an axis coincident with or parallel to the common axis of piston motion, and comprising one or more off-centre balancing mass(es), to counteract rocking motion created by the piston motion and thereby assist in dynamically balancing the machine.

The balance shaft rotates synchronously with the piston motion so as to cancel or substantially cancel rocking vibration created by the piston motion. The masses are provided on the balance shaft positioned appropriately to oppose the rotating moment created by movement of all the pistons.

The balance shaft may be electrically driven, or may be Mechanically driven by a linkage to one (or more) of the pistons.

The machine may have three, four or more pistons-cylinders, which may operate in substantially 120, 90 or 360/piston number phasing.

In one form the machine is an engine such as an external internal combustion engine such as a heat engine and more preferably a Stirling engine, for example. The pistons drive associated electric generators such as linear electric generators.

In another form the machine is a driven machine such as a pump or compressor for example, and electric motors such as linear electric motors drive the pistons.

BRIEF DESCRIPTION OF THE DRAWINGS

A four piston machine of the invention is described with reference to the accompanying drawings in which.

DETAILED DESCRIPTION OF EMBODIMENT

Figure 1:
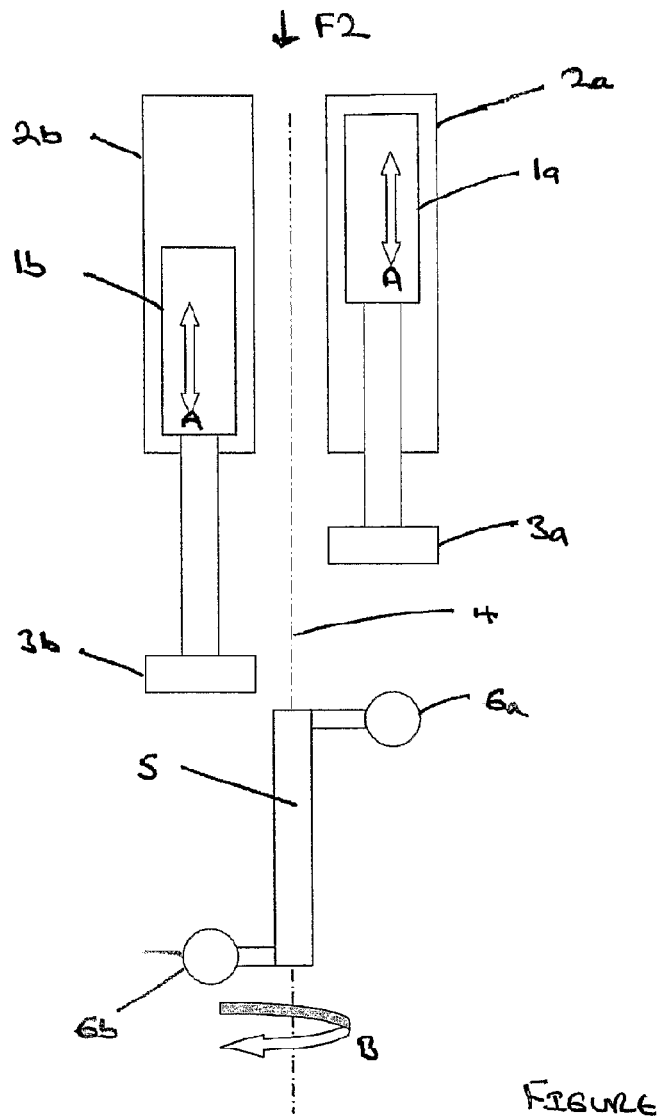
FIG. 1 schematically shows the four piston machine from one side, showing two pistons-cylinders (the other two being hidden behind), and FIG. 2 schematically shows the machine of FIG. 1 in the direction of arrow F2 in FIG. 1.
Figure 2:
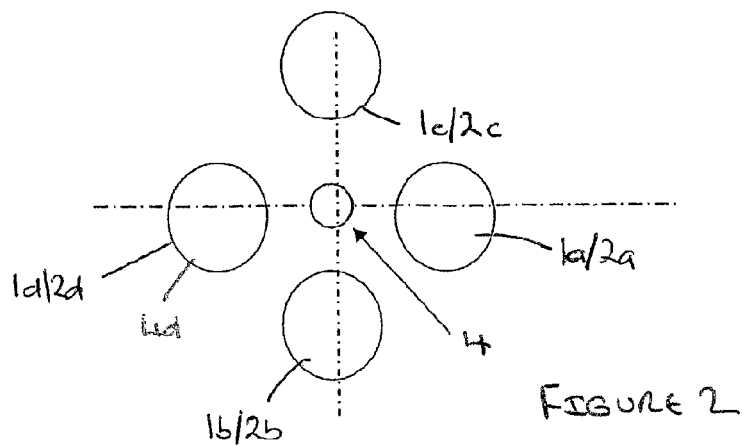

The figures schematically illustrate a four piston-cylinder machine which is an engine, and electric generator.

Pistons 1a, 1b, 1c, and 1d operate reciprocally in cylinders 2a, 2b, 2c, and 2d in the direction of arrows A, each at 90 degrees out of phase. The pistons may be pistons of an external combustion engine such as Stirling engine.

The pistons are not mechanically limited, nor linked to a common mechanical output drive shaft.

Each piston 1a-1d drives one of four linear electric generators 3a-3d. The electrical outputs of the generators may be combined.

The pistons operate parallel to a common axis 4. A balance shaft 5 is mounted for rotation about axis 4. The balance shaft rotates about axis 4 as indicated by arrow B and carries four masses 6a-6d which are spaced 90 degrees apart radially around the rotational axis 4 of the balance shaft transverse to the axis of the balance shaft (only two masses 6a and 6b are visible in the drawings).

The balance shaft is driven so that it rotates synchronously with the piston motion, and the balancing masses 6a-6d are sized to counteract rotating-rocking motion created by the piston motion, and dynamically balance the engine. Specifically and for example, as piston 1a approaches top dead centre and piston lb bottom dead centre, masses 6a and 6b are in the positions illustrated.

The balance shaft 4 carrying the balancing masses 6a-6d may be driven by an electric motor or by a mechanical linkage, such as a connecting rod drive, from one or more of the pistons. The mechanism can be substantially lighter than one requited to accommodate the full engine load.

A four piston-cylinder engine is shown. In an alternative embodiment the engine may comprise three, five or more pistons-cylinders, and additional appropriate balancing masses are provided on the balance shaft 5.

In an alternative embodiment the machine may be a driven machine such as a pump or compressor for example. In this case integers 3a may be electric motors such as linear electric motors, which independently drive each piston.

In a multicylinder free piston machine such as a multicylinder free piston Stirling engine, although vibration forces of the pistons and linear alternators, separated at 120 or 90 degree phasing for a three and four cylinder engine respectively for example, are balanced in the line of piston motion, there is still a rocking vibration that circulates about the central axis of the engine. This is as a result of and is not cancelled by opposing piston motion. Free piston machines have added cyclic mass due to the added linear alternator mass, making the vibration levels worse. In the free piston machine of the invention however, this rocking vibration can be substantially cancelled by the balance shaft and masses, ameliorating this problem.

The foregoing describes the invention including a specific embodiment thereof. Alterations and modifications as would be obvious to those skilled in the art are intended to be incorporated within the scope hereof as defined in the accompanying claims.

The invention claimed is:

1. A machine comprising multiple cylinders each housing a piston for reciprocating movement within the cylinder, the piston-cylinders being arranged for piston movement parallel to a common axis, each piston driving an independent load or being independently driven, wherein the machine comprises a balance shaft comprising one or more off-centre balancing masses and arranged to rotate synchronously with the piston motion about an axis coincident with or parallel to the common axis of piston motion to counteract rocking motion created by the piston motion and thereby assist in dynamically balancing the machine.

2. A machine according to claim 1 wherein the axis of rotation of the balance shaft is co-incident with the common axis of piston motion.

3. A machine according to claim 1 wherein the machine has three pistons-cylinders and the balance shaft comprises three balancing masses equidistantly spaced around the axis of rotation of the balance shaft.

4. A machine according to claim 1 wherein the machine has four pistons-cylinders and the balance shaft comprises four balancing masses equidistantly spaced around the axis of rotation of the balance shaft.

5. A machine according to claim l wherein the machine has five pistons-cylinders and the balance shaft comprises five balancing masses equidistantly spaced around the axis of rotation of the balance shaft.

6. A machine according to claim 1 wherein the balance shaft is electrically driven.

7. A machine according to claim 1 wherein the balance shaft is mechanically driven by a linkage to at least one of the pistons.

8. A machine according to claim 1 wherein the machine is an external combustion engine.

9. A machine according to claim 1 wherein the machine is a Stirling engine.

10. A machine according to claim 9 wherein the pistons drive associated electric generators.

11. A machine according to claim 9 each piston drives an associated linear electric generator.

12. A machine according to claim 1 wherein the machine is a pump or compressor.

13. A machine according to claim 1 wherein the machine is a pump or compressor driven by an electric motor or motors.

14. A machine according to claim 1 wherein the machine is a pump or compressor and each piston is driven by a linear electric motor.

15. An electrical generation unit comprising an engine comprising multiple cylinders each housing a piston for reciprocating movement within the cylinder, the piston-cylinders being arranged for piston movement parallel to a common axis, each piston independently driving an electric generator, the machine also comprising a balance shaft arranged to rotate synchronously with piston motion about an axis coincident with or parallel to the common axis of piston motion and comprising one or more off-centre balancing masses positioned on the balance shaft to oppose the rotating moment created by movement of all the pistons to cancel or substantially cancel rocking vibration created by the piston motion and thereby assist in dynamically balancing the machine.

16. A machine according to claim 15 wherein the machine is an external combustion engine.

17. A machine according to claim 15 wherein the machine is a Stirling engine.

* * * * *